US010350765B2

United States Patent
Ueberle et al.

(10) Patent No.: US 10,350,765 B2
(45) Date of Patent: Jul. 16, 2019

(54) SWITCHING A CONTROL OF A ROBOT INTO A MANUAL OPERATING MODE

(71) Applicant: KUKA Deutschland GmbH, Augsburg (DE)

(72) Inventors: Marc-Walter Ueberle, Friedberg (DE); Matthias Rohmer, Augsburg (DE); Tobias Reichl, Munich (DE); Gunter Schreiber, Friedberg (DE); Martin Mueller-Sommer, Aindling (DE); Uwe Bonin, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 110 days.

(21) Appl. No.: 15/190,343

(22) Filed: Jun. 23, 2016

(65) Prior Publication Data

US 2016/0375588 A1  Dec. 29, 2016

(30) Foreign Application Priority Data

Jun. 24, 2015  (DE) ........................ 10 2015 008 144

(51) Int. Cl.
*B25J 13/08* (2006.01)
*B25J 9/16* (2006.01)
*B25J 9/00* (2006.01)

(52) U.S. Cl.
CPC .......... *B25J 13/085* (2013.01); *B25J 9/0081* (2013.01); *B25J 9/1674* (2013.01); *G05B 2219/39319* (2013.01); *G05B 2219/39346* (2013.01); *G05B 2219/39433* (2013.01)

(58) Field of Classification Search
None
See application file for complete search history.

(56) References Cited

U.S. PATENT DOCUMENTS

| 5,363,474 A * | 11/1994 | Sarugaku | B25J 9/1674 |
|---|---|---|---|
| | | | 700/256 |
| 6,385,508 B1 | 5/2002 | McGee et al. | |
| 9,339,934 B2 | 5/2016 | Kogan | |
| 9,724,827 B2 | 8/2017 | Ueberle | |

(Continued)

FOREIGN PATENT DOCUMENTS

| CN | 101801616 A | 8/2010 |
|---|---|---|
| CN | 104227715 A | 12/2014 |

(Continued)

OTHER PUBLICATIONS

German Patent Office; Examination Report in German Patent Application No. 10 2015 008 144.6 dated Oct. 30, 2015; 10 pages.

(Continued)

*Primary Examiner* — Genna M Mott
(74) *Attorney, Agent, or Firm* — Dorton & Willis, LLP

(57) ABSTRACT

A method for switching a control of a robot into a manual operating mode, wherein the robot is movable by a user manually applying at least one of a force or a torque upon the robot, includes detecting at least one of joint forces or joint torques of the robot, and triggering an error reaction in response to the switching and based on at least one of the detected joint forces and/or joint torques, target joint forces and/or target joint torques, or a pose of the robot.

12 Claims, 1 Drawing Sheet

(56) References Cited

U.S. PATENT DOCUMENTS

| | | | | |
|---|---|---|---|---|
| 2013/0345872 A1* | 12/2013 | Brooks | ............... | B25J 9/0087 |
| | | | | 700/259 |
| 2014/0107843 A1 | 4/2014 | Okazaki | | |
| 2014/0379126 A1 | 12/2014 | Kuka | | |
| 2015/0081098 A1* | 3/2015 | Kogan | ................ | B25J 9/1656 |
| | | | | 700/258 |
| 2016/0121484 A1* | 5/2016 | Ikeda | .................. | B25J 9/1633 |
| | | | | 700/256 |

FOREIGN PATENT DOCUMENTS

| | | |
|---|---|---|
| CN | 104440913 A | 3/2015 |
| DE | 69636230 T2 | 4/2007 |
| DE | 102008027008 A1 | 12/2009 |
| DE | 102008062622 A1 | 6/2010 |
| DE | 102009018403 A1 | 10/2010 |
| DE | 102013218823 A1 | 4/2015 |
| EP | 2189255 A1 | 5/2010 |
| EP | 2492062 A2 | 8/2012 |
| KR | 20140147681 A | 12/2014 |
| KR | 20150032639 A | 3/2015 |

OTHER PUBLICATIONS

Korean Patent Office; Examination Report in Korean Patent Application No. 10-2016-0079643 dated Aug. 24, 2017; 9 pages.
Chinese Patent Office; Office Action in related Chinese Patent Application No. 2016104721041 dated Mar. 27, 2018; 15 pages.
European Patent Office; Examination Report in related European Patent Application No. 16 001 269.6 dated Feb. 1, 2019; 6 pages.

\* cited by examiner

SWITCHING A CONTROL OF A ROBOT INTO A MANUAL OPERATING MODE

CROSS-REFERENCE TO RELATED APPLICATIONS

This application claims the benefit of priority under 35 U.S.C. § 119(a) to German Patent Application DE 10 2015 008 144.6 filed Jun. 24, 2015 (pending), the disclosure of which is hereby incorporated by reference in its entirety.

TECHNICAL FIELD

The present invention relates to a method for switching a control of a robot into a manual operating mode, a control, and a computer program for executing the method, as well as a robot arrangement comprising said control.

BACKGROUND

A manual operating mode for moving a robot by manually applying forces and/or torque upon said robot is known from DE 10 2013 218 823 A1.

In such a manual operating mode, forces and/or torque applied externally upon the robot and thus in particular forces and/or torque applied manually upon the robot can be determined advantageously based on joint forces and/or joint torque detected and determined using a model of the robot.

The manual operating mode is therefore sensitive to errors of the model, in particular a robot-controlled load, and the detection of the joint forces and/or joint torques. In particular, here unexpected and/or undesired reactions of the robot may occur when switching into the manual operating mode.

For example, the weight force of a robot-guided load not reflected in the model or registered as too light might lead to an unexpected and undesired sagging of the robot due to the switching into the manual operating mode, since this weight force is erroneously detected as a vertical force manually applied upon the robot for moving said robot. In an operating mode preceding the manual operating mode, in which the robot is, for example, (only) position-controlled or shows higher impedance, the same load not modeled or simulated too lightly leads at best to a reduced precision of positioning.

The objective of the present invention is to improve the control of a robot.

SUMMARY

According to one aspect of the present invention, in a method for switching control of a robot into a manual operating mode, which is provided and/or established for moving the robot by manually applying forces and/or torque upon the robot, here an error reaction is triggered due to the switching and depending on the detected joint forces and/or joint torque and/or target joint forces and/or target torque and/or a pose of the robot.

This way, in one embodiment advantageously in particular an unexpected and/or undesired reaction of the robot due to the switching can be reduced and/or a user manually operating the robot or supervising it can be warned.

In one embodiment the robot includes at least three, in particular at least six, in particular at least seven joints, in particular pivot joints, that can be or are actuated in particular by electromotive drives and/or drives comprising joints.

In one embodiment the control is communicating, in particular wirelessly or wired with the robot, in particular with its drives, and in a further development it is implemented, in particular by hardware and/or software and/or programming to control the drives, in particular to predetermine and/or command target values, in particular target joint forces and/or target torque, in particular target currents or target voltages.

In the present case, in particular forces and torque refer respectively to joint forces and joint torque, which act upon in particular the joints of the robot, in particular between a drive and a robot link moved thereby and/or connected thereto.

In one embodiment, in particular by force and/or torque sensors at the drives, or indirectly in particular based on energy values detected, in particular currents or voltages, the drives can be detected, in particular measured directly or indirectly.

In the manual operating mode the robot follows in one embodiment of a force manually applied from the outside and/or a torque, manually applied from the outside, in particular by deviation depending on the force and/or torque, in particular in the direction of said force and/or torque, or also in a predetermined, in particular Cartesian, direction, and/or according to the value of the force and/or the torque. In one embodiment, for this purpose and/or in the manual operating mode it can be controlled based on force, in particular controlled by impedance or admittance. In this regard, reference is made again to DE 10 2013 218 823 A1 mentioned at the outset, with its disclosure in its entirety being included in the present disclosure.

Forces and/or torque can be applied in particular directly by applying force and/or torque upon the robot itself and/or via one or more force or torque impact points at the robot itself or indirectly via one or more elements coupled thereto, in particular connected thereto, in particular an end effector, a robot-guided tool, a handle or lever or the like guiding an end effector, and/or via one or more force and/or torque impact points at said element or elements.

In one embodiment the error reaction is triggered depending on whether a joint force or a joint torque of the robot, which is applied by a force acting upon the robot from outside or a torque acting upon the robot from outside exceeds a joint threshold, in particular exceeds its value, in particular when and if a joint force or a joint torque exceeds the predetermined joint threshold when and if a joint force or a joint torque is applied upon the robot.

A joint threshold defines in one embodiment a threshold for a force and/or a torque applied upon a joint, thus it can state in particular a force or a torque, in particular.

In one embodiment the same or different joint thresholds are predetermined for at least two joints of the robot. In one embodiment, at least one predetermined joint threshold amounts to at least 1 Nm, in particular at least 5 Nm, and/or maximally to 100 Nm, in particular maximally to 75 Nm.

The force acting upon the robot from outside or the torque acting upon the robot from outside and/or the joint forces and/or the joint torque $\tau_e$ can be determined in one embodiment based on detected joint forces and/or joint torque $\tau_{meas}$ and model-based and/or based on estimated joint forces and/or joint torque of a robot based on a model $\tau_{model}$, in particular based on a difference between them: $\tau_e = \tau_{meas} - \tau_{model}$, in particular represent said difference. Forces and torque acting upon the robot, which are considered in the model, for example a weight force of a robot-guided model load, are allocated to the robot (model) such that a force acting upon the robot from the outside and/or a torque acting upon the robot from outside in the sense of the present invention represents a force in the model not (correctly) considered and/or a torque in the model not (correctly) considered. In other words, a force acting upon the robot from outside and/or a torque acting upon the robot from outside may be an interfering force and/or interfering torque, in particular a weight and/or a torque applied thereby of a robot-guided load, which is unknown or erroneously identified, a force manually applied upon the robot and/or a torque manually applied upon the robot, or the like.

If the value of such a joint force or such a joint torque exceeds a joint threshold, this indicates a respective model error which could lead to unexpected and/or undesired reactions of the robot. Therefore, it can be advantageously used to detect model errors and thus the triggering of the error reaction.

However, even without any model errors, due to forces or torque acting upon the robot externally, here joint forces and/or joint torque $\tau_e$ may be applied, for example when users manually operating the robot or intending to do so during the switching process already pull on the robot or put stress on the robot during the switching process in reference to the environment, in particular clamping.

In one embodiment the error reaction is alternatively or additionally, in particular in a logical OR-composition with the joint threshold, triggered depending on whether the change $d\tau_{d,i}/dt$ exceeds a target joint force or a target joint torque $\tau_{d,i}$ due to the switching, in particular exceeds the value of the change threshold, in particular if and when the temporal change of a force or torque is or can be determined based on the control of joint forces or joint torque, which are determined in particular based on joint forces and/or joint torque, exceeding determined and/or predetermined target joint forces and/or target joint torques of the robot, in particular the value thereof.

This way, in one embodiment advantageously in particular the above-explained situations and/or switching within a virtual wall can be considered and/or unexpected motions during the switching can be reduced and/or avoided, in particular independently from their causes.

A change threshold defines in one embodiment a threshold for a change, in particular a temporal one, in particular a deduction of a target joint force or a target joint torque, thus it can state in particular a change, in particular a temporal one, in particular a derivative, a force, or a torque.

In one embodiment the same or different change thresholds are predetermined for at least two joints of the robot. In one embodiment at least one predetermined change threshold amounts to at least 1 Nm/s and/or maximally 10 Nm/s. Similar to the above-stated upper and lower limits for the joint threshold, this upper and lower threshold is of course also dependent on the machine and can therefore be predetermined in one embodiment depending on the machine or specifically.

If the amount of the change of a target joint force or a target joint torque exceeds a change threshold, this indicates a respective model error, which could lead to an unexpected and/or undesired reaction of the robot, because it is improbable that the user significantly increases the forces and/or torque applied from the outside precisely with the switching process. Therefore, the temporal change of target joint forces and/or target torque due to switching can also be used advantageously to detect a model error and thus to trigger an error reaction.

Alternatively or additionally, in particular in a logical OR-composition with the joint threshold and/or the change threshold, in one embodiment the error reaction is triggered depending on whether a vertical force determined based on detected joint forces and/or joint torques of the robot, acting externally upon the robot, exceeds a vertical force threshold, in particular regarding the value, if and/or when a vertical force determined based on determined joint forces and/or joint torque of the robot, acting externally upon the robot, exceeds a vertical force threshold, in particular its value.

A vertical force is in one embodiment a force parallel to the direction of gravity.

The vertical force $f_z$ externally acting upon the robot can in one embodiment be determined based on detected joint forces and/or joint torque of the robot, in particular based on a projection of a difference $\tau_e = \tau_{meas} - \tau_{model}$ between detected joint forces and/or joint torque $\tau_{meas}$ and model-based and/or based on a model of the robot's estimated joint forces and/or joint torque $\tau_{model}$ in the Cartesian space, in particular according to $f_z = (j_z^T)^\# \tau_e$ with the pseudoinverse$^\#$ of the transposed$^T$ of the line $$j_z = \left[ \frac{\partial Z}{\partial q_1} \cdots \frac{\partial Z}{\partial q_n} \right]$$

of the Jacobi-matrix of a robot-fixed reference, in particular of the TCP of the robot, with the vertical component Z of the Cartesian position and orientation of the robot-fixed reference and the joint coordinates $q_1, \ldots, q_n$ of the n-joint robot, in one embodiment $$(j_z^T)^\# = \begin{cases} 0 \Leftrightarrow j_z = 0 \\ \dfrac{j_z}{j_z j_z^T} \end{cases}.$$

If the robot carries a load, its weight force applies at least one vertical force upon the robot. If the robot and/or this load are not modeled or not modeled correctly, an appropriate vertical force develops based on the detected joint forces and/or joint torque of the robot which acts externally upon the robot. If this value exceeds the threshold of the vertical force, this may advantageously be used for detecting a model error and thus for triggering the error reaction.

A threshold of the vertical force defines in one embodiment a threshold for a vertical force, acting externally upon a robot, in particular directly upon it or via an element coupled thereto, thus it can in particular state a force, in particular represent it.

Similarly, based on the detected joint forces and/or joint torque of the robot, in particular in case of a falsely modeled position of the center of gravity of a load guided by the robot, a horizontal torque results acting externally upon the robot.

Accordingly, in one embodiment alternatively or additionally, in particular in a logical OR-composition with the joint threshold, the change threshold, and/or the vertical force threshold, the error reaction is triggered depending thereon, if a horizontal torque based on detected joint forces and/or joint torque of the robot, acting externally upon the robot, in particular with regards to its value, exceeds a threshold of the horizontal torque, in particular if and when at least one horizontal torque determined based on the joint forces and/or joint torque of the robot acting upon the robot from the outside exceeds a horizontal torque threshold, in particular with its value.

In one embodiment a horizontal torque represents a torque about one or two axis/axes, in particular perpendicular in reference to each other, perpendicular to the direction of gravity.

A threshold for the horizontal torque defines in one embodiment a threshold for a horizontal torque, externally acting upon the robot, in particular directly or via an element coupled thereto, thus it can in particular state a torque, in particular represent it.

A horizontal torque T acting upon the robot can be determined in one embodiment based on detected joint forces and/or joint torque of the robot, in particular based on a projection of a difference $\tau_e=\tau_{meas}-\tau_{model}$ between detected joint forces and/or joint torque $\tau_{meas}$ and model-based and/or based on a model of the robot estimated joint forces and/or joint torque $\tau_{model}$ in the Cartesian space, in particular according to $T=(j_\omega^T)^\# \tau_e$ with the pseudo-inverse$^\#$ of the transposed$^T$ of the line $$j_\omega = \left[\frac{\partial \omega}{\partial q_1} \cdots \frac{\partial \omega}{\partial q_n}\right]$$

of the Jacobi-matrix of a robot-fixed reference, in particular a TCP of the robot with a horizontal rotation component and/or axis of rotation $\omega$ and the joint coordinates $q_1, \ldots, q_n$ of the n-joint robot, in one embodiment $$(j_\omega^T)^\# = \begin{cases} 0 \Leftrightarrow j_\omega = 0 \\ \dfrac{j_\omega}{j_\omega j_\omega^T} \end{cases}.$$

If the robot carries a load, its weight force applies a tilting effect about at least one horizontal axis upon the robot. If this load is not modeled or incorrectly modeled, based on the detected joint forces and/or joint torque of the robot, a respective external horizontal torque results acting upon the robot. When its value now exceeds the threshold of the horizontal torque, this can be used advantageously for detecting a model error and thus for triggering an error reaction.

The detection of one or such a (faulty) vertical force and/or horizontal torque based on the detected joint forces and/or joint torque of the robot depends on the pose of the robot. For example, a robot-guided load applies in a so-called straight position, in which a robot with a bent arm is stretched vertically upwards, shows no or only minor joint forces and/or joint torque. Accordingly then, a threshold for the vertical force and/or horizontal torque can be fallen short of, even in a falsely modeled load, and can thus prevent the detection of a model error.

Therefore, in particular in one embodiment the error reaction is triggered alternatively or additionally, in particular in a logical OR-composition with the joint threshold, the change threshold, the vertical force threshold, and/or the horizontal torque threshold, depending on whether a ratio of a vertical force acting externally upon the robot in reference to joint forces thereby applied and/or joint torque of the robot or the ratio of a horizontal torque acting upon the robot in reference to applied joint forces and/or joint torque of the robot, in particular with regards to the value and/or based on the robot pose, exceeds a pose threshold, in particular if and/or when a ratio of a vertical force externally acting upon the robot in reference to applied joint forces and/or joint moments of the robot or a ratio of a horizontal torque acting upon the robot to joint forces and/or joint torque of the robot applied thereby exceed a pose threshold, in particular with regards to the value and/or based on the robot pose.

A pose threshold defines in one embodiment a threshold for a ratio of a vertical force acting externally upon the robot to joint forces and/or joint torques of the robot applied thereby or for a ratio of a horizontal torque acting externally upon the robot to joint forces and/or joint torques of the robot applied thereby, it can therefore in particular state or represent a ratio of forces and/or torques.

The ratio $\zeta$ of a vertical force externally acting upon the robot and/or a horizontal torque acting upon the robot in reference to joint forces and/or joint torque of the robot applied thereby can in one embodiment be determined based on the amount of the above-explained pseudoinverse $(j_z^T)^\#$, $(j_\omega^T)^\#$, in particular according to $\lambda=|(j_z^T)_\#|$ and/or $\zeta=|(j_\omega^T)^\#|$. Similarly, inversely it can also be determined based on the value of the line $j_z$ and/or $f_\omega$ of the Jacobi-matrix of the TCP of the robot, in particular according to $\zeta=|j_z|^{-1}$ and/or $\zeta=|j_\omega|^{-1}$. The ratios of a vertical force and two horizontal torques can similarly also be determined jointly via the respective sub-matrix $J_{z,\omega_x,\omega_y}$ of the Jacobi-matrix and/or its pseudoinverse, or via the pseudoinverse of the entire Jacobi-matrix.

In addition to model errors, even in case of correct models per se, external forces, which are not purely vertical, and torques, which are not purely horizontal, such as applied for example by the operator or a clamping situation of the robot may act upon the robot, (also) lead to detected vertical forces based on determined joint forces and/or joint torques of the robot, acting externally upon the robot and/or horizontal torque based on determined joint forces and/or joint torques of the robot, acting externally upon the robot.

Therefore, in a further development the error reaction is triggered depending on whether both the vertical force acting upon the robot, determined by joint forces and/or joint torque of the robot, or a horizontal torque externally acting upon the robot determined based on joint forces and/or joint torque of the robot, exceed a horizontal torque threshold, as well as additionally and/or in a logical AND-composition an external load complementary thereto, determined based on joint forces and/or joint torque of the robot, falls short of a load threshold, in particular with regards to the value.

The complementary external load K can be determined in one embodiment, based on detected joint forces and/or joint torque of the robot, in particular based on a zero-room projection of a difference $\tau_e=\tau_{meas}-\tau_{model}$ between detected joint forces and/or joint torque $\tau_{meas}$ and model-based and/or based on a model of the robot's estimated joint forces and/or joint moments $\tau_{model}$, in particular according to $K=\tau_e-j_z^T(j_z^T)^\#\tau_e$ respectively, a corresponding expanded zero room projection also for two horizontal torques $K=\tau_e-J_{z,\omega_x,\omega_y}^T(J_{z,\omega_x,\omega_y}^T)^\#\tau_e$ perpendicular to each other with the respective sub-matrix $J_{z,\omega_x,\omega_y}$ the Jacobi-matrix and/or its pseudoinverse.

The error reaction comprises in one embodiment a limitation of a speed of motion of the robot, in particular in the Cartesian space and/or in the joint coordinates and/or axial space of the robot. Additionally or alternatively, the error reaction comprises in one embodiment a limitation of the work area and/or a permitted motion of the robot, in particular in the Cartesian space and/or in the joint coordinates and/or axial space of the robot. Additionally or alternatively, the error reaction comprises in one embodiment an increase of a virtual damping of the robot and/or one by control-technology. This way, advantageously a respectively unexpected and/or undesired reaction of the robot can be limited in any case.

Additionally or alternatively, the error reaction comprises in one embodiment the, in particular, optic, acoustic, and/or haptic issuance of error signals.

One or more thresholds may (each) be predetermined fixed and/or by the manufacturer. Similarly, one or more thresholds (each) can be parameterized and/or variably (predeterminably), in particular predetermined and/or parameterized, in particular by a user and/or an input.

According to one aspect of the present invention, a device for controlling a or the robot of a robot arrangement is implemented or embodied in particular by hardware and/or software and/or program technology to execute the method described here:

Means for switching the control in a manually guided operating mode for moving the robot by manually applying forces and/or torque upon the robot; and Means for triggering an error reaction after switching and depending on the detected and/or target joint forces and/or target torque and/or a pose of the robot.

The means for triggering an error reaction comprises in one embodiment:

Means for detecting joint forces and/or joint torques and/or a pose of the robot and/or for predetermining target joint forces and/or target torques of the robot; and/or Means for triggering the error reaction depending on whether a vertical force determined based on detected joint forces and/or joint torques of the robot, acting externally upon the robot, exceeds a vertical force threshold; and/or Means for triggering an error reaction depending on whether a horizontal torque determined based on detected joint forces and/or joint torques of the robot, acting externally upon the robot, exceeds a horizontal torque threshold; and/or Means for triggering the error reaction depending on whether a change of a target joint force or a target joint torque due to the switching exceeds a change threshold; and/or Means for triggering an error reaction depending on whether a ratio of a vertical force acting externally upon the robot in reference to joint forces and/or joint torques of the robot applied thereby or a ratio of a horizontal torque externally acting upon the robot in reference to joint forces and/or joint torque of the robot applied thereby exceed a pose threshold; and/or Means for triggering an error reaction depending on whether a joint force applied by a force acting externally upon the robot or a torque acting externally upon the robot or a torque applied by a force acting externally upon the robot or a torque acting externally upon the robot exceeds a joint threshold; and/or Means for triggering the error reaction depending on whether both the vertical force determined based on detected joint forces and/or the joint torque of the robot, acting externally upon the robot, exceed the vertical force threshold, or a horizontal torque determined based on detected joint forces and/or joint torque of the robot, acting externally upon the robot, exceed the horizontal torque threshold, as well as a complementary external load additionally determined based on joint forces and/or joint torque of the robot falls short of a load threshold.

In one embodiment the control comprises means for the force-controlled, in particular impedance- or admittance-controlled handling of the robot in the manual operating mode.

In one embodiment the means for triggering an error reaction include means for limiting a speed of motion and/or an operating room of the robot, in particular a joint or Cartesian room, means for increasing a virtual damping and/or means for issuing an error signal.

In one embodiment the control comprises means for the modifiable predetermination of at least one threshold.

A means in the sense of the present invention may be embodied by way of technical hardware and/or software means, in particular a processing, in particular micro-processing unit (CPU), preferably connected via a storage and/or bus system transmitting data and/or signals, in particular digital ones, and/or show one or more programs or program modules. The CPU may be embodied such that commands are implemented to process a program saved in a storage system, record input signals from a data bus and/or issue output signals to a data bus. A storage system may comprise one or more, in particular different storage media, in particular optical, magnetic, solid matter, and/or other non-volatile media. The program may be embodied such that it represents and/or can implement the methods described here such that the CPU can execute the steps of such methods and thus can in particular control the robot.

BRIEF DESCRIPTION OF THE DRAWINGS

Additional advantages and features are found in the dependent claims and the exemplary embodiments, wherein the drawings show, in partially schematic views:

DETAILED DESCRIPTION

Figure 1:
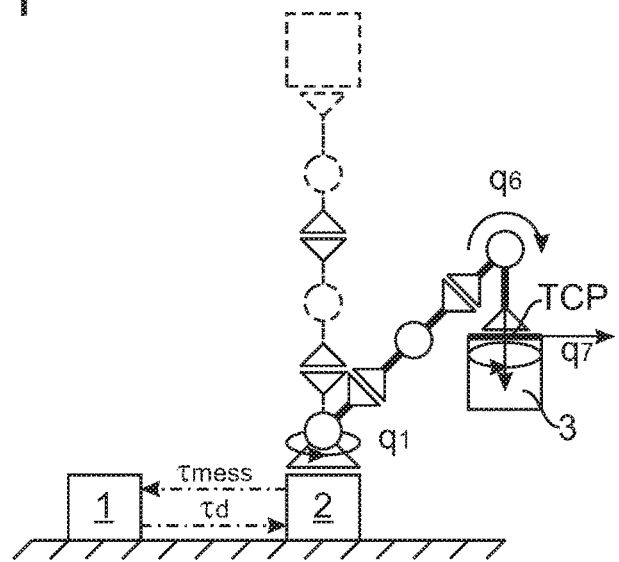
FIG. 1 depicts a robot arrangement with a robot and a control according to one embodiment of the present invention.

FIG. 1 shows a robot arrangement with a robot 2 and a control 1 for controlling the robot according to one embodiment of the present invention.

The robot comprises in the exemplary embodiment seven actuated pivot joints, therefrom in FIG. 1 in an exemplary fashion the joint coordinate and/or the joint angle $q_1$ of the proximal first pivot joint as well as the joint coordinates and/or coordinate angle $q_6$, $q_7$ of the sixth and distal seventh pivot joint being indicated.

At the flange of the robot, where its TCP is indicated, a load 3 guided by the robot 2 is indicated. Additionally, in dot-dash lines a vertical so-called straight position of the robot 2 is indicated.

Figure 2:
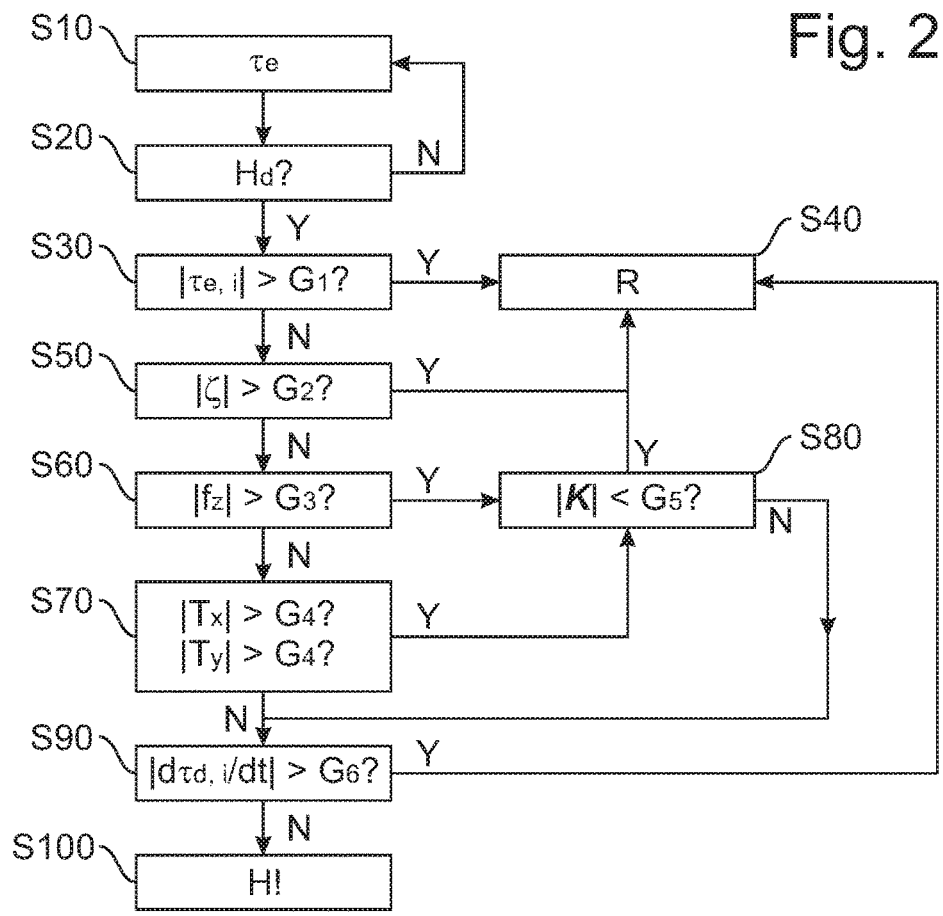
FIG. 2: depicts a method for switching the control into a manual operating mode according to one embodiment of the present invention.

The control 1 performs a method, explained in the following in greater detail in particular with reference to FIG. 2 for switching the control into a manual operating mode according to one embodiment of the present invention and/or is embodied by hardware and/or software, in particular by a computer program product according to one embodiment of the present invention.

In a first step S10, the joint torque $\tau_e$ applied by a force externally acting upon the robot or a torque externally acting upon the robot is determined based on joint torque $\tau_{meas}$ and based on a model of the robot estimated joint torque $\tau_{model}$: $\tau_e = \tau_{meas} - \tau_{model}$.

In a second step S20 it is checked if switching of the control 1 into the manual operating mode, which is implemented to move the robot 2 by manually applying forces and/or torque upon the robot, has been ordered. As long as this is not the case (S20: "N") the method returns to step S10.

If switching into the manual operating mode was ordered (S20: "Y"), the control 1 checks in step S30 if at least one joint torque $\tau_{e,i}$ of the joint torque $\tau_e$ determined in step S10 exceeds a predetermined joint threshold $G_1$ with its value.

If, for example, the load 3 was not modeled or modeled falsely, its weight force applies in the pose shown in FIG. 1 in an exploded illustration, in particular in the first joint $q_1$, an additional joint torque $\tau_{e,1}$, which accordingly deviates from the joint torque $\tau_{model,1}$ estimated based on the (false) model of the robot 2.

If at least one joint torque $\tau_{e,i}$ exceeds the predetermined joint threshold $G_1$ (S30: "Y"), in a step S40 an error reaction R is triggered, in particular a motion speed and/or a work area of the robot 2 is limited, a virtual damping of the impedance-controlled robot 2 is increased, and/or an error signal is issued.

Otherwise the method continues with step S50.

Here, the control 1 checks if the robot 2 is in a pose in which an extreme vertical force acting upon the robot would only apply (too) little joint torque, such as is the case in the stretched position indicated for example in FIG. 1 in dot-dash lines: it is discernible that the weight force of the robot-guided load 3 in this pose (theoretically) would not apply any additional joint torque, and thus a respective model error of load 3 in this pose could not be detected based on the weight and/or the joint torque applied thereby.

In the exemplary embodiment the control 1 determines in step S50 a ratio $$\zeta = \frac{1}{|j_z|}$$

of a vertical force externally acting upon the robot to the joint torque of the robot applied thereby via the line $$j_z = \begin{bmatrix} \frac{\partial Z}{\partial q_1} & \cdots & \frac{\partial Z}{\partial q_n} \end{bmatrix}$$

of the Jacobi-matrix J of the TCP with the vertical component Z of the Cartesian position and orientation of the TCP. The vertical force $f_z$ externally acting at its TCP upon the robot is projected by the transposed Jacobi-matrix $J^T$ of TCP into the joint torque $(J^T[0\ 0\ f_z\ 0\ 0\ 0]^T = j_z^T f_z = \tau_e)$, so that for the ratio of the values of the vertical force externally acting upon the robot to the hereby applied joint torque it applies:

$$\frac{|f_z|}{|\tau_e|} = \frac{1}{|j_z|}.$$

If the ratio $\zeta$ is greater than a pose threshold $G_2$ or equivalent thereto $|j_z|$ is below the respective pose threshold $1/G_2$, (S50: "Y"), in step S40 an error reaction is triggered as well.

Similarly, in particular via the corresponding sub-matrix $J_{z,\omega_x,\omega_y}$ the Jacobi-matrix, it is checked if an external horizontal torque acting upon the robot would only apply (too) little joint torque.

If the robot 2 is not in a pose in which the external vertical forces and/or the horizontal torque apply insufficient joint torque (S50: "N") the control 1 continues with step S60.

Here it determines, based on the joint torque determined in step S10, a vertical force externally acting upon the robot $f_z = (j_z^T)^\# \tau_e$ with the pseudoinverse of the line $j_z$ of the Jacobi-matrix and checks if its value exceeds a vertical force threshold $G_3$. In one variant the determination occurs alternatively via the sub-matrix $J_{z,\omega_x,\omega_y}$.

If this is not the case (S60: "N") it determines in a step S70 similarly, based on the joint torque determined in step S10, horizontal torque $T_x$, $T_y$, externally acting upon the robot, about an x-axis perpendicular to the vertical and about a y-axis perpendicular to the vertical of the Cartesian space in TCP and checks if at least the value of one of these torques exceeds a horizontal torque threshold $G_4$.

If the vertical threshold $G_3$ or the horizontal torque-threshold $G_4$ is exceeded (S60: "Y" OR S70: "Y") the control continues with step S80.

Here it checks if additionally the value of an external load, determined based on the joint torque of the robot in step S10, complementary to the vertical force $f_z$ and the horizontal torques $T_x$, $T_y$ $K = \tau_e - J_{z,\omega_x,\omega_y}{}^T (J_{z,\omega_x,\omega_y}{}^T)^\# \tau_e$ falls short of a load threshold $G_5$. If this is the case (S80: "Y"), in step S40 an error reaction is triggered as well.

Otherwise (S70: "N" OR S80: "N") the control continues with step S90, in which it checks if at least one change $d\tau_{d,i}/dt$ of a target joint torque $\tau_{d,i}$ due to the switching, exceeds a change threshold $G_6$ with its value.

If the value of a change of a target joint torque exceeds the change threshold (S90: "Y"), in step S40 an error reaction is triggered as well.

Otherwise (S90: "N") in step S100 it is switched into the normal manual operation mode.

In the exemplary embodiment joint torque $\tau_{d,i}$, $\tau_{e,i}$ and horizontal torques $T_x$, $T_y$ are compared individually with thresholds. Here, the same or different thresholds may be predetermined for different joints. Similarly, the joint torques $\tau_d$, $\tau_e$ overall, in particular their standard vector value, can be compared to a threshold. Accordingly, in general a joint force and/or a joint torque in the sense of the present invention may be one-dimensional or multi-dimensional in one embodiment.

Although exemplary embodiments have been explained in the above description, it is hereby noted that a number of modifications are possible.

For example, one or more of the tests S30, S50, S60, S70, and S90 in a logical OR-composition performed in the exemplary embodiment and/or the check S80 performed in a logical AND-composition, may be waived in particular also when the vertical force threshold $G_3$ or the horizontal torque threshold $G_4$ is exceeded, always the error reaction R can be performed.

Similarly, in a variant one or more of these checks can also be performed only upon an initial switching into the manual operating mode after starting and/or initializing the control 1 and/or the robot 2.

In addition, it is hereby noted that the exemplary embodiments are merely examples which are not intended to in any way restrict the scope of protection, the uses, and the construction. Rather, the preceding description gives a person skilled in the art a guideline for the implementation of at least one exemplary implementation, wherein various modifications, in particular with respect to the function and arrangement of the components described, can be undertaken without departing from the scope of protection as indicated by the claims and the equivalent combinations of features.

Even though exemplary embodiments are explained in the description above, it should be pointed out that a plurality of modifications are possible. Moreover, it should be pointed out that the exemplary embodiments are merely examples that do not restrict the scope of protection, the applications and configuration in any way. Instead, the description above gives the person skilled in the art a guideline for implementing at least one exemplary embodiment. At the same time it is possible to make diverse modifications, in particular, with respect to the function and the arrangement of the components described without departing from the scope of protection that will become apparent from the claims and the combination of features equivalent thereto.

LIST OF REFERENCE NUMBERS

1 Control
2 Robot
3 Load
$f_z$ Vertical force
$G_1, \ldots, G_6$ Threshold
$T_x, T_y$ Horizontal torque
$\tau_d = [\tau_{d,1}, \ldots, \tau_{d,7}]^T$ Target joint torque
$\tau_e = [\tau_{e,1}, \ldots, \tau_{e,7}]^T$ By external force/torque Applied joint torque
$\tau_{meas}$ Joint torque detected
$\zeta$ Ratio (external)
Vertical force/Horizontal torque/Joint torque
q1, . . . , q7 Joint coordinates
H Manual operating mode
R Error reaction
K Complementary external load

What is claimed is:

1. A method for switching a control of a robot into a manual operating mode wherein the robot is movable by a user manually applying at least one of a force or a torque upon the robot, the method comprising:
   detecting with a robot controller at least one of joint forces or joint torques exerted by a drive associated with at least one joint of the robot, wherein the detecting step is performed either by directly measuring the at least one of joint forces or joint torques by sensors or by indirectly measuring the at least one of joint forces or joint torques based on currents or voltages applied to control the drive;
   switching the control to the manual operating mode from a different operating mode;
   determining at least one external force or external torque acting on the robot using the detected joint forces or joint torques and a model of the robot; and
   triggering an error reaction during the switching in response to determining an error in the model and based on at least one of:
      the detected joint forces and/or joint torques,
      target joint forces and/or target joint torques, or
      a pose of the robot;
   wherein the error reaction comprises at least one of:
      limiting at least one of a motion speed or a work area of the robot, or
      increasing a virtual damping.

2. The method of claim 1, wherein the error reaction is triggered based on whether at least one of:
   a vertical force determined based on the detected joint forces and/or joint torques of the robot, acting externally upon the robot, exceeds a predetermined vertical force threshold;
   a horizontal torque externally acting upon the robot and determined based on detected joint forces and/or joint torques exceeds a predetermined horizontal torque threshold;
   a change of a target joint force or a target joint torque resulting from the switching exceeds a change threshold;
   a ratio of a vertical force, acting externally upon the robot, to joint forces and/or joint torques of the robot resulting from the vertical force, or a ratio of a horizontal torque acting externally upon the robot to joint forces and/or joint torque of the robot resulting from the horizontal torque, exceeds a pose threshold; or
   a joint force of the robot resulting from one of a force acting externally upon the robot or a torque acting externally upon the robot, or a joint torque of the robot resulting from a force acting externally upon the robot or a torque acting externally upon the robot exceeds a joint threshold.

3. The method of claim 2, wherein the error reaction is triggered based on whether:
   the vertical force determined from the detected joint forces and/or joint torques of the robot, acting externally upon the robot, exceed the predetermined vertical force threshold, or the horizontal torque determined from the detected joint forces and/or joint torques of the robot, acting externally upon the robot, exceeds the predetermined horizontal torque threshold; and
   a load determined from the determined joint forces and/or joint torques of the robot, complementary to the vertical force and the horizontal torque, is less than a load threshold.

4. The method of claim 1, further comprising controlling the robot in the manual operating mode using force control.

5. The method of claim 4, where in the force control is one of impedance or admittance control.

6. The method of claim 1, wherein the error reaction further comprises issuing an error signal.

7. The method of claim 1, wherein limiting the work area of the robot comprises limiting a joint space or a Cartesian space of the robot.

8. The method of claim 1, wherein at least one threshold is fixed or is variably predetermined.

9. The method of claim 1, wherein an error is determined in the model of the robot based on:
   the amount of change of a target joint force or a target joint torque exceeding a change threshold;
   the detection of a temporal change of target joint forces or target joint torques; or
   a deviation between detected joint forces or torques and joint forces or torques determined by the model exceeding a threshold.

10. A controller for controlling a robot, the controller including programming code stored on a non-transient, computer-readable medium that, when executed by the controller, causes the controller to:
    detect at least one of joint forces or joint torques exerted by a drive associated with at least one joint of the robot, wherein the detecting is performed either by directly measuring the at least one of joint forces or joint torques by sensors or by indirectly measuring the at least one of joint forces or joint torques based on currents or voltages applied to control the drive;
    determine at least one external force or external torque acting on the robot using the detected joint forces or joint torques and a model of the robot; and trigger an error reaction during a switching of the robot into a manual operating mode that facilitates moving the robot by a user manually applying at least one of a force or a torque on the robot, the error reaction triggered in response to the determination of an error in the model and based on at least one of:
- the detected joint forces and/or joint torques,
- target joint forces and/or target joint torques, or
- a pose of the robot;

wherein the error reaction comprises at least one of:
- limiting at least one of a motion speed or a work area of the robot, or
- increasing a virtual damping.

11. A robot arrangement, comprising:
a robot; and
a controller according to claim 9.

12. A computer program product including program code stored on a non-transient, computer-readable medium that, when executed by a computer, causes the computer to:
detect at least one of joint forces or joint torques exerted by a drive associated with at least one joint of a robot, wherein the detecting is performed either by directly measuring the at least one of joint forces or joint torques by sensors or by indirectly measuring the at least one of joint forces or joint torques based on currents or voltages applied to control the drive;

determine at least one external force or external torque acting on the robot using the detected joint forces or joint torques and a model of the robot; and trigger an error reaction during a switching of the robot into a manual operating mode that facilitates moving the robot by a user manually applying at least one of a force or a torque on the robot, the error reaction triggered in response to the determination of an error in the model and based on at least one of:
- the detected joint forces and/or joint torques,
- target joint forces and/or target joint torques, or
- a pose of the robot;

wherein the error reaction comprises at least one of:
- limiting at least one of a motion speed or a work area of the robot, or
- increasing a virtual damping.

* * * * *